(12) United States Patent
Christiansen

(10) Patent No.: US 10,545,498 B2
(45) Date of Patent: Jan. 28, 2020

(54) VEHICLE STEERING CONTROL

(71) Applicant: Ford Global Technologies, LLC, Dearborn, MI (US)

(72) Inventor: Jens Christiansen, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 15/655,947

(22) Filed: Jul. 21, 2017

(65) Prior Publication Data
US 2019/0025823 A1    Jan. 24, 2019

(51) Int. Cl.
| | | |
|---|---|---|
| *G06F 19/00* | (2018.01) | |
| *G05D 1/00* | (2006.01) | |
| *B60Q 3/283* | (2017.01) | |
| *B60R 1/00* | (2006.01) | |
| *B62D 6/10* | (2006.01) | |
| *B62D 15/02* | (2006.01) | |
| *G05D 1/02* | (2006.01) | |

(52) U.S. Cl.
CPC .......... *G05D 1/0061* (2013.01); *B60Q 3/283* (2017.02); *B60R 1/00* (2013.01); *B62D 6/10* (2013.01); *B62D 15/025* (2013.01); *B62D 15/029* (2013.01); *G05D 1/021* (2013.01)

(58) Field of Classification Search
CPC ...... G05D 1/0061; G05D 1/021; B60Q 3/283; B60R 1/00; B62D 1/046; B62D 1/06; B62D 6/10; B62D 15/02; B62D 15/025; B62D 15/029

USPC .......................................................... 701/23
See application file for complete search history.

(56) References Cited

U.S. PATENT DOCUMENTS

| | | | |
|---|---|---|---|
| 5,835,870 A | 11/1998 | Kagawa | |
| 7,679,495 B2 | 3/2010 | Beutnagel-Buchner et al. | |
| 9,235,987 B2* | 1/2016 | Green | ................ G05D 1/0055 |
| 9,567,008 B2 | 2/2017 | Eichhorn | |
| 2003/0191568 A1* | 10/2003 | Breed | .................. B60W 40/06 701/36 |
| 2005/0060069 A1* | 3/2005 | Breed | .................. B60N 2/2863 701/408 |
| 2005/0248136 A1* | 11/2005 | Breed | ................. B60R 21/0152 280/735 |
| 2006/0208169 A1* | 9/2006 | Breed | .................... B60N 2/002 250/221 |
| 2009/0319095 A1* | 12/2009 | Cech | ...................... B60K 35/00 701/1 |
| 2014/0244115 A1 | 8/2014 | Sanma et al. | |
| 2015/0203117 A1* | 7/2015 | Kelly | ..................... B60K 31/02 701/91 |

(Continued)

FOREIGN PATENT DOCUMENTS

| | | |
|---|---|---|
| DE | 10346691 A1 | 5/2005 |
| WO | WO 2016023756 A1 | 2/2016 |

*Primary Examiner* — Ronnie M Mancho
(74) *Attorney, Agent, or Firm* — Frank A. MacKenzie; Bejin Bieneman PLC

(57) ABSTRACT

A computer is programmed to, upon determining that a vehicle entered an autonomous-steering mode, deactivate a plurality of lights on a steering-wheel rim; and upon initiating a transition of the vehicle from the autonomous-steering mode to a manual-steering mode, illuminate at least one of the lights that is at a steering-wheel angle corresponding to a current steering angle of the vehicle.

17 Claims, 4 Drawing Sheets

(56) References Cited

U.S. PATENT DOCUMENTS

| | | | |
|---|---|---|---|
| 2016/0001781 A1* | 1/2016 | Fung .................... | B60W 40/08 |
| | | | 701/36 |
| 2017/0057542 A1 | 3/2017 | Kim et al. | |
| 2018/0017969 A1* | 1/2018 | Nagy .................. | B60W 50/082 |
| 2019/0031224 A1* | 1/2019 | Huber .................... | B62D 1/184 |

* cited by examiner

VEHICLE STEERING CONTROL

BACKGROUND

The Society of Automotive Engineers (SAE) has defined multiple levels of autonomous vehicle operation. At levels 0-2, a human driver monitors or controls the majority of the driving tasks, often with no help from the vehicle. At level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

During Level 2 or 3 autonomous driving, a vehicle occupant is expected to maintain attention on the task of driving the vehicle while the vehicle performs many of the actions of the driving task and/or be prepared to take over operation of the vehicle. During Level 4 autonomous driving, the vehicle may request that the driver intervene when entering particular environments, and during Level 5 autonomous driving, the driver may still request to take control of the vehicle. Handing over control from the vehicle to the driver is a problem in semi-autonomous and autonomous vehicles that allow manual driving. If the vehicle is nonautonomous or operating nonautonomously, then the handover process does not arise because the driver entirely or mostly maintains control of the vehicle.

DETAILED DESCRIPTION

Figure 1:
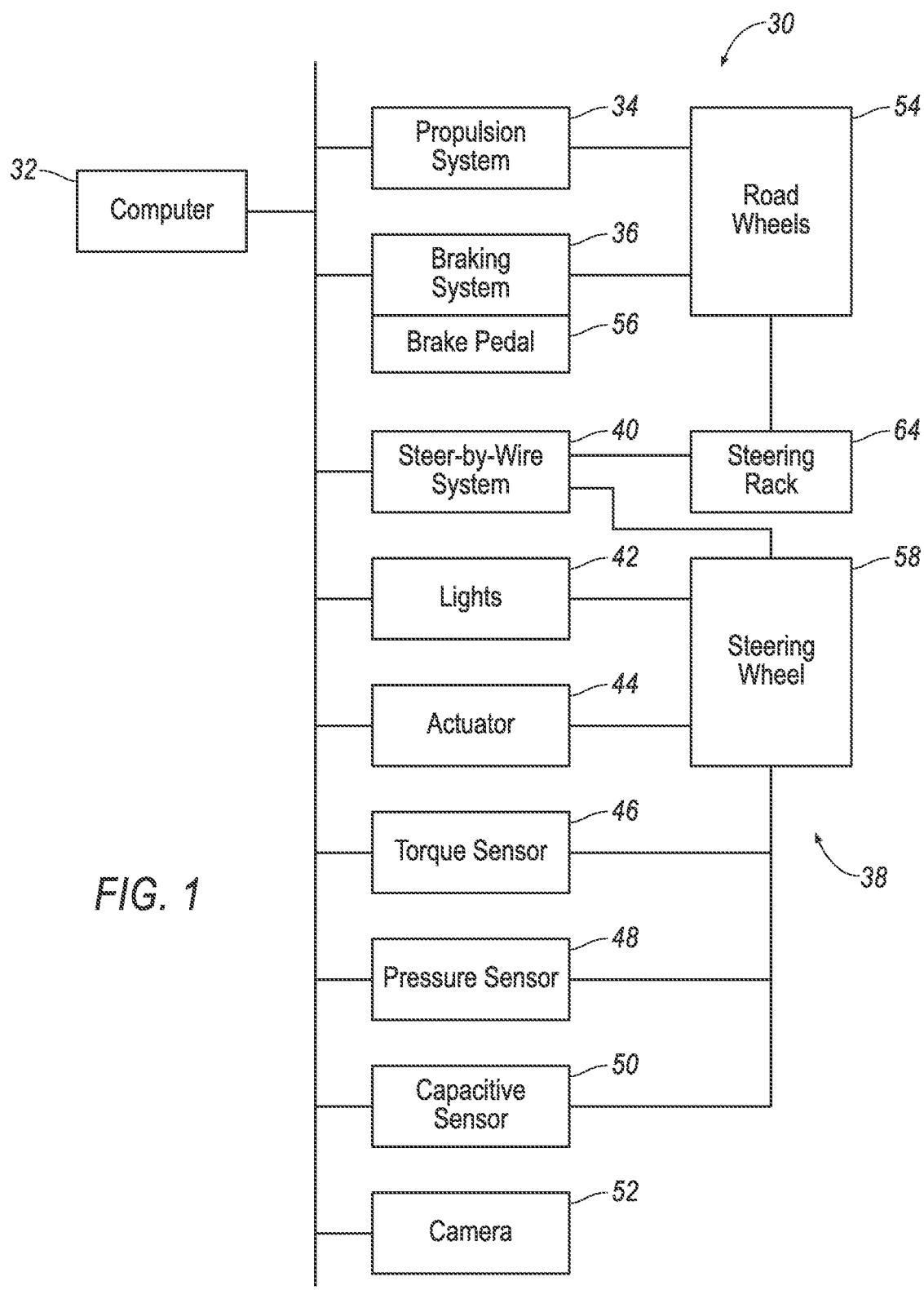
FIG. 1 is a block diagram of an exemplary vehicle.

The steering system disclosed herein addresses a problem arising in control of semi-autonomous and autonomous vehicles and provides a solution that allows for enhanced control of such vehicles. The steering system includes a steer-by-wire system, a steering wheel having an illuminated display of lights, and a computer programmed to communicate with the human driver using the lights. The steering system provides for informed handover from the computer to the human driver while minimizing driver distraction during autonomous driving.

A computer is programmed to, upon determining that a vehicle entered an autonomous-steering mode, deactivate a plurality of lights on a steering-wheel rim; and upon initiating a transition of the vehicle from the autonomous-steering mode to a manual-steering mode, illuminate at least one of the lights that is at a steering-wheel angle corresponding to a current steering angle of the vehicle.

The computer may be further programmed to, upon determining that the vehicle is in the autonomous-steering mode, instruct an actuator rotatably coupled to the steering-wheel rim to hold the steering-wheel rim stationary.

The computer may be further programmed to, upon receiving data indicating that hands of an occupant of the vehicle are grasping the steering-wheel rim, initiate the transition from the autonomous-steering mode to the manual-steering mode. The data indicating that the hands of the occupant are grasping the steering-wheel rim may include data from a pressure sensor attached to the steering-wheel rim. The data indicating that the hands of the occupant are grasping the steering-wheel rim may include data from a capacitive sensor disposed on the steering-wheel rim. The data indicating that the hands of the occupant are grasping the steering-wheel rim may include data from a torque sensor coupled to the steering-wheel rim. The data indicating that the hands of the occupant are grasping the steering-wheel rim may include data from a camera having a field of view encompassing the steering-wheel rim.

The computer may be further programmed to, upon receiving data indicating that a brake pedal is pressed, initiate the transition from the autonomous-steering mode to the manual-steering mode.

A method includes, upon determining that a vehicle entered an autonomous-steering mode, deactivating a plurality of lights on a steering-wheel rim; and upon initiating a transition of the vehicle from the autonomous-steering mode to a manual-steering mode, illuminating at least one of the lights that is at a steering-wheel angle corresponding to a current steering angle of the vehicle.

The method may further include, upon determining that the vehicle is in the autonomous-steering mode, instructing an actuator rotatably coupled to the steering-wheel rim to hold the steering-wheel rim stationary.

The method may further include, upon receiving data indicating that hands of an occupant of the vehicle are grasping the steering-wheel rim, initiating the transition from the autonomous-steering mode to the manual-steering mode. The data indicating that the hands of the occupant are grasping the steering-wheel rim may include data from a pressure sensor attached to the steering-wheel rim. The data indicating that the hands of the occupant are grasping the steering-wheel rim may include data from a capacitive sensor disposed on the steering-wheel rim. The data indicating that the hands of the occupant are grasping the steering-wheel rim may include data from a torque sensor coupled to the steering-wheel rim. The data indicating that the hands of the occupant are grasping the steering-wheel rim may include data from a camera having a field of view encompassing the steering-wheel rim.

The method may further include, upon receiving data indicating that a brake pedal is pressed, initiating the transition from the autonomous-steering mode to the manual-steering mode.

A vehicle includes a steering-wheel rim, a plurality of lights on the steering-wheel rim, and a computer in communication with the plurality of lights. The computer is programmed to upon determining that the vehicle entered an autonomous-steering mode, deactivate the plurality of lights; and upon initiating a transition of the vehicle from the autonomous-steering mode to a manual-steering mode, illuminate at least one of the lights that is at a steering-wheel angle corresponding to a current steering angle of the vehicle.

The vehicle may include an actuator rotatably coupled to the steering-wheel rim. The computer may be in communication with the actuator, and the computer may be further programmed to, upon determining that the vehicle is in the autonomous-steering mode, instruct the actuator to hold the steering-wheel rim stationary.

The vehicle may include a sensor in communication with the computer. The sensor may be one of a pressure sensor attached to the steering-wheel rim, a capacitive sensor disposed on the steering-wheel rim, a torque sensor coupled to the steering-wheel rim, and a camera facing the steering-wheel rim. The computer may be further programmed to, upon receiving data from the sensor indicating that hands of an occupant of the vehicle are grasping the steering-wheel rim, initiate the transition from the autonomous-steering mode to the manual-steering mode.

With reference to FIG. 1, a vehicle 30 may be an autonomous vehicle. A computer 32 can be configured to operate the vehicle 30 independently of the intervention of a human driver, completely or to a lesser degree. The computer 32 may be programmed to operate a propulsion system 34, a braking system 36, a steering system 38, and/or other vehicle systems. For the purposes of this disclosure, autonomous operation means the computer 32 controls the propulsion system 34, braking system 36, and steering system 38; semi-autonomous operation means the computer 32 controls one or two of the propulsion system 34, braking system 36, and steering system 38 and a human driver controls the remainder; and nonautonomous operation means the human driver controls the propulsion system 34, braking system 36, and steering system 38.

The computer 32 is a microprocessor-based computer. The computer 32 includes a processor, memory, etc. The memory of the computer 32 includes memory for storing instructions executable by the processor as well as for electronically storing data and/or databases. The computer 32 may be a single computer or multiple computers networked together.

The computer 32 may transmit signals through a communications network such as a controller area network (CAN) bus, Ethernet, WiFi, Local Interconnect Network (LIN), onboard diagnostics connector (OBD-II), and/or by any other wired or wireless communications network. The computer 32 may be in communication with the propulsion system 34; the braking system 36; components of the steering system 38, such as a steer-by-wire system 40, a plurality of lights 42, an actuator 44, a torque sensor 46, a pressure sensor 48, and a capacitive sensor 50; and a camera 52.

The propulsion system 34 of the vehicle 30 generates energy and translates the energy into motion of the vehicle 30. The propulsion system 34 may be a known vehicle propulsion subsystem, for example, a conventional powertrain including an internal-combustion engine coupled to a transmission that transfers rotational motion to road wheels 54; an electric powertrain including batteries, an electric motor, and a transmission that transfers rotational motion to the road wheels 54; a hybrid powertrain including elements of the conventional powertrain and the electric powertrain; or any other type of propulsion. The propulsion system 34 can include an electronic control unit (ECU) or the like that is in communication with and receives input from the computer 32 and/or a human driver. The human driver may control the propulsion system 34 via, e.g., an accelerator pedal and/or a gear-shift lever.

The braking system 36 is typically a known vehicle braking subsystem and resists the motion of the vehicle 30 to thereby slow and/or stop the vehicle 30. The braking system 36 may include friction brakes such as disc brakes, drum brakes, band brakes, etc.; regenerative brakes; any other suitable type of brakes; or a combination. The braking system 36 can include an electronic control unit (ECU) or the like that is in communication with and receives input from the controller and/or a human driver. The human driver may control the braking system 36 via, e.g., a brake pedal 56.

The steering system 38 is typically a known vehicle steering subsystem and controls the turning of the road wheels 54. The steering system 38 may be a rack-and-pinion system with electric power-assisted steering, a system using steer-by-wire, as both are known, or any other suitable system. The steering system 38 can include an electronic control unit (ECU) or the like that is in communication with and receives input from the computer 32 and/or a human driver. The steering system 38 may include a steering wheel 58 by which the human driver may control the steering system 38. For the steering system 38 using steer-by-wire, the steering system 38 may include a steering rack 64 coupled to the road wheels 54, the steer-by-wire system 40, the steering wheel 58, and the actuator 44.

Figure 2:
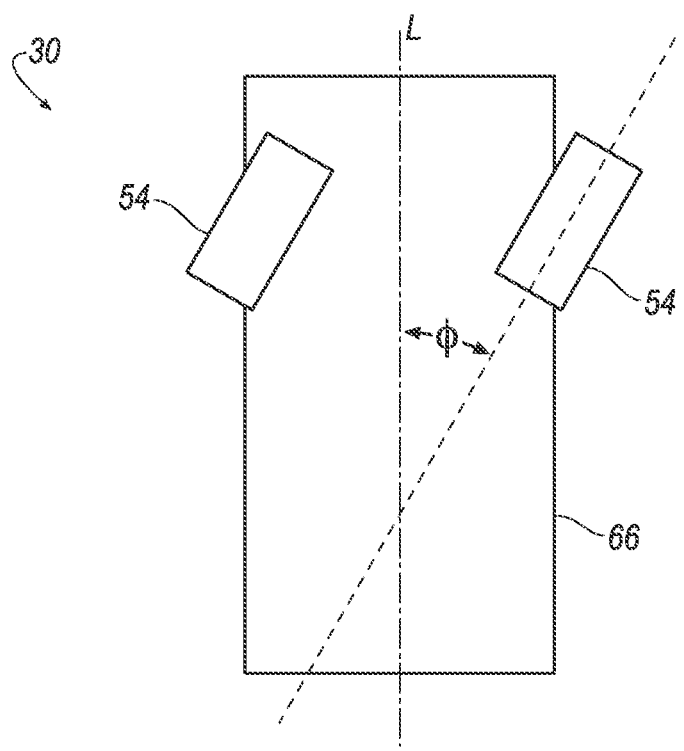
FIG. 2 is a top view of the vehicle.

The steering rack 64 is connected to the steer-by-wire system 40, and the steering rack 64 is coupled to the road wheels 54. The steering rack 64 may be connected to the steer-by-wire system 40 via, e.g., electromechanical actuators (not shown) that transform an electrical signal into mechanical motion of the steering rack 64. The position of the steering rack 64 determines the turning of the road wheels 54. As shown in FIG. 2, the road wheels 54 have a steering angle $\varphi$, that is, an angle that the road wheels 54 are turned relative to a vehicle body 66 of the vehicle 30. The steering angle $\varphi$ may be measured relative to a longitudinal axis L extending in a vehicle-forward direction. For example, when the road wheels 54 are oriented in a forward direction, the steering angle $\varphi$ is zero; when the road wheels 54 are turned to the right, the steering angle $\varphi$ has a negative value; and when the road wheels 54 are turned to the left, the steering angle $\varphi$ has a positive value.

With continued reference to FIG. 1, the steer-by-wire system 40 may be connected to the steering rack 64 as described and connected to the steering wheel 58. The steer-by-wire system 40 may include a wiring harness and the ECU (not shown) in communication with the steering rack 64 and the steering wheel 58. In other words, there is no mechanical connection between the steering wheel 58 and the steering rack 64, only an electrical or electronic connection.

Figure 3:
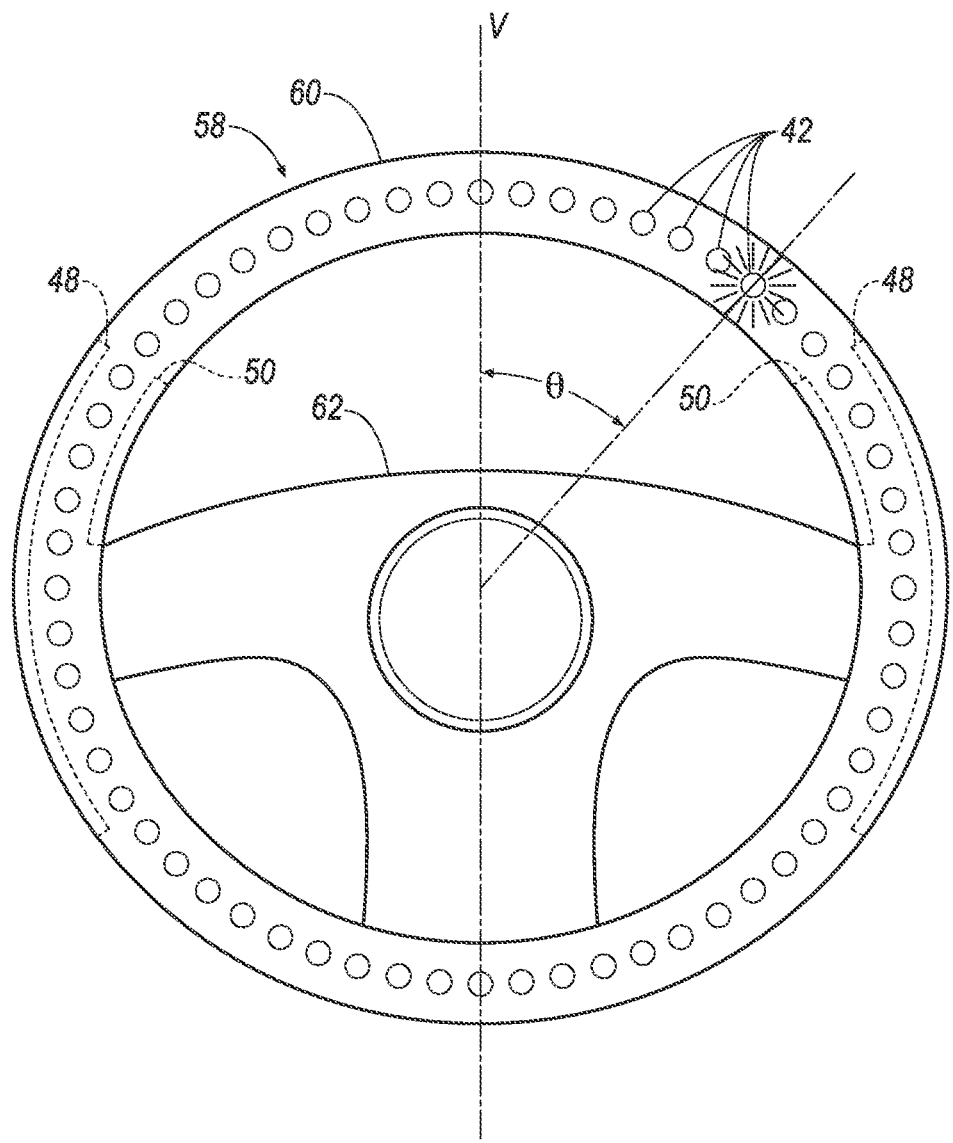
FIG. 3 is a front view of a steering wheel of the vehicle.

With reference to FIGS. 1 and 3, the steering wheel 58 may be rotatably coupled to an instrument panel (not shown) facing a seat for a human driver. The steering wheel 58 includes a steering-wheel rim 60, which has a circular shape, and a steering-wheel body 62, which couples the steering-wheel rim 60 to the instrument panel and to the steer-by-wire system 40. As shown in FIG. 3, the steering wheel 58 has a steering-wheel angle $\theta$. The steering-wheel angle $\theta$ may be measured relative to a reference axis, such as a vertical axis V through a center of the steering wheel 58 and an uppermost point of the steering-rim 60 when the steering wheel 58 is centered. For example, when the steering wheel 58 is centered, the steering-wheel angle $\theta$ is zero; when the steering wheel 58 is rotated to the right, the steering-wheel angle $\theta$ has a negative value; and when the steering wheel 58 is rotated to the left, the steering-wheel angle $\theta$ has a positive value. The steer-by-wire system 40 may detect the steering-wheel angle $\theta$ via a position sensor (not shown), e.g., a Hall effect sensor, a rotary encoder, etc.

With reference to FIG. 1, the actuator 44 is in communication with the computer 32 and rotatably coupled to the steering-wheel rim 60, e.g., via a steering column (not shown) and the steering-wheel body 62. The actuator 44 may apply a torque T to the steering wheel 58, causing or resisting rotation of the steering wheel 58. The torque T applied by the actuator 44 is variable, and the computer 32 may instruct the actuator 44 to apply a particular level of torque T to the steering wheel 58. The actuator 44 may be, for example, an electric motor.

With continued reference to FIG. 1, the torque sensor 46 is positioned to detect torque causing the steering-wheel rim 60 to rotate. The torque sensor 46 is coupled to the steering-wheel rim 60, e.g., via the steering column and/or the steering-wheel body 62. The torque sensor 46 may be any type of sensor that measures applied torque, such as a torque transducer, i.e., a plurality of strain gauges wired together; a twist-angle torque sensor, i.e., a plurality of angular position sensors wired together; etc.

With reference to FIGS. 1 and 3, the pressure sensor 48 is attached to the steering-wheel rim 60. The pressure sensor 48 is positioned to be gripped by a hand of an occupant who is grasping the steering-wheel rim 60. The pressure sensor 48 may extend around the steering-wheel rim 60, or multiple pressure sensors 48 may be attached about the steering-wheel rim 60. Alternatively, the pressure sensor 48 may be attached to the steering-wheel rim 60 only at positions likely to be grasped by the occupant, e.g., 60°-100° and 260°-300° relative to the reference angle. The pressure sensor 48 may be any suitable type of pressure sensor for detecting pressure from the hand of the human driver, e.g., a piezoelectric strain, capacitive diaphragm, electromagnetic diaphragm, piezoelectric, optical, or potentiometric sensor.

With reference to FIGS. 1 and 3, the capacitive sensor 50 is disposed on the steering-wheel rim 60. The capacitive sensor 50 is positioned to be touched by a hand of an occupant who is grasping the steering-wheel rim 60. The capacitive sensor 50 may extend around the steering-wheel rim 60, or multiple capacitive sensors 50 may be attached about the steering-wheel rim 60. Alternatively, the capacitive sensor 50 may be attached to the steering-wheel rim 60 only at positions likely to be grasped by the occupant, e.g., 60°-100° and 260°-300° relative to the reference angle. The capacitive sensor 50 may be any suitable type of sensor that detects changes in an electric field caused by proximity to human skin, e.g., a surface capacitive sensor, a projected capacitive touch sensor such as a mutual capacitive sensor or a self-capacitive sensor, etc.

With reference to FIG. 1, the camera 52 may be provided in a passenger cabin of the vehicle 30. The camera 52 faces the steering-wheel rim 60. The camera 52 is typically mounted so that it has a field of view encompassing the steering-wheel rim 60. The camera 52 may be positioned so that the field of view is blocked by hands of the occupant grasping the steering-wheel rim 60 but not blocked by other objects, such as a body of the occupant. The camera 52 detects visual images.

With reference to FIGS. 1 and 3, the plurality of lights 42 is disposed on the steering-wheel rim 60. The lights 42 may be arranged in a circle following the steering-wheel rim 60. The lights 42 may be evenly spaced around the steering-wheel rim 60. The lights 42 may face an occupant of the vehicle 30 who is facing the steering-wheel rim 60. The position of each light may be defined by the steering-wheel angle θ from the reference angle, same as for the steering wheel 58. The lights 42 are able to illuminate individually. The lights 42 may be able to illuminate in one color or in one of multiple colors at a time. The lights 42 may be, e.g., light-emitting diodes (LEDs).

Figure 4:
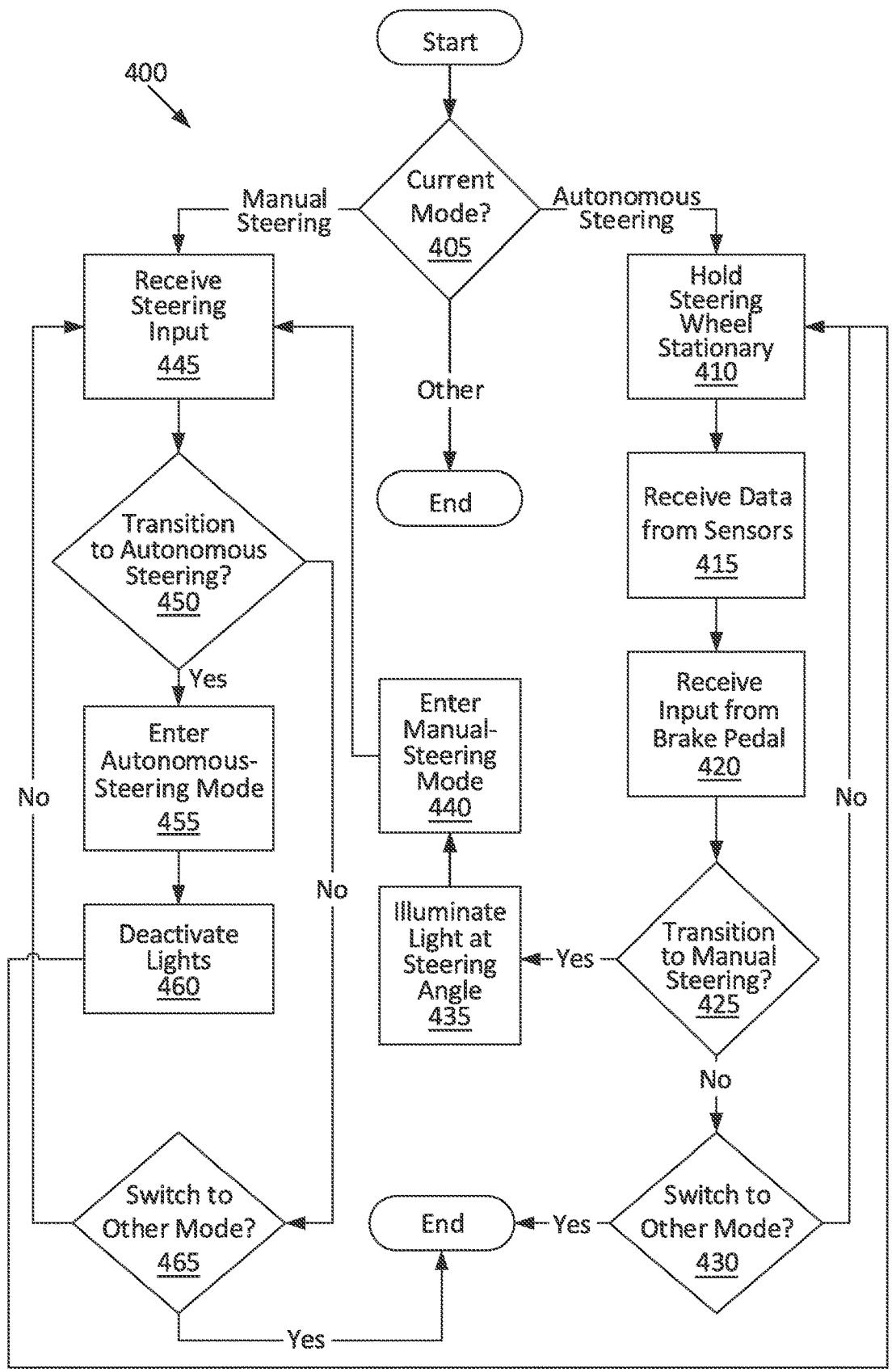
FIG. 4 is a process flow diagram of an exemplary process for controlling a steering system of the vehicle.

FIG. 4 is a process flow diagram illustrating an exemplary process 400 for controlling the steering system 38. The memory of the computer 32 stores programming for performing the steps of the process 400.

The process 400 begins in a decision block 405, in which the computer 32 determines a steering mode in which the vehicle 30 is operating. The steering mode is a parameter that the computer 32 stores in memory. The steering modes that the vehicle 30 may be operating in include an autonomous-steering mode, a manual-steering mode, and other modes. For the purposes of this disclosure, the autonomous-steering mode is defined as a mode in which the computer 32 operates the steering system 38; the propulsion system 34 and the braking system 36 may be operated by either the computer 32 or the human driver. For the purposes of this disclosure, the manual-steering mode is defined as a mode in which the human driver operates the steering system 38; the propulsion system 34 and the braking system 36 may be operated by either the computer 32 or the human driver. If the steering mode is the manual-steering mode, the process 400 proceeds to a block 445. If the steering mode is neither the manual-steering mode nor the autonomous-steering mode, the process 400 ends.

If the steering mode is the autonomous-steering mode, next, in a block 410, the computer 32 instructs the actuator 44 to hold the steering-wheel rim 60 stationary. In other words, the steering wheel 58 does not move. The computer 32 may be simultaneously instructing the road wheels 54 to turn; however, the steering-wheel angle θ of the steering-wheel rim 60 remains substantially equal to zero.

Next, in a block 415, the computer 32 receives data from the sensors 46, 48, 50, 52, i.e., one or more of the pressure sensor 48, the capacitive sensor 50, the torque sensor 46, and the camera 52. The data indicate whether the hands of the occupant are grasping the steering-wheel rim 60. The data from the pressure sensor 48 indicate whether the detected pressure is above a pressure threshold or within a pressure range. The pressure threshold or pressure range may be preset and may be chosen based on, e.g., experiments showing the pressure from occupants grasping the steering-wheel rim 60. The data from the capacitive sensor 50 indicate whether the detected capacitance at any location of the capacitive sensor 50 on the steering-wheel rim 60 is within a capacitance range. The capacitance range may be preset and may be chosen based on, e.g., experiments showing the capacitance from occupants grasping the steering-wheel rim 60. The data from the torque sensor 46 indicate whether the detected torque is above a torque threshold or within a torque range. The torque threshold or torque range may be preset and may be chosen based on, e.g., experiments showing the torque from occupants attempting to turn the steering wheel 58. The data from the camera 52 may indicate whether the steering-wheel rim 60 is obstructed from the field of view of the camera 52. For example, the computer 32 may compare the images from the camera 52 with baseline images of an unobstructed steering-wheel rim 60 and/or a steering-wheel rim 60 obstructed by hand(s). If the images from the camera 52 deviate from the baseline image of the obstructed steering-wheel rim 60, are a close match to the baseline images of the obstructed steering-wheel rim 60, or are a closer match to the baseline images of the obstructed steering-wheel rim 60 than to the unobstructed steering-wheel rim 60, then the data from the camera 52 indicate that the hands of the occupant are grasping the steering-wheel rim 60.

Next, in a block 420, the computer 32 receives data from the brake pedal 56 indicating whether the brake pedal 56 has been pressed. A position sensor (not shown) coupled to the brake pedal 56 may transmit data indicating that the brake pedal 56 is depressed by more than a position threshold. The position threshold may be chosen by, e.g., experiment to be less than intentional pressing of the brake pedal 56 and greater than inadvertent pressing.

Next, in a decision block 425, the computer 32 determines whether to transition to the manual-steering mode. The computer 32 transitions to the manual-steering mode if the computer 32 received data from the sensors 46, 48, 50, 52 in the block 415 indicating that the hands of the occupant are grasping the steering-wheel rim 60 or if the computer 32 received data from the brake pedal 56 in the block 420 indicating that the brake pedal 56 has been pressed. If the computer 32 determines to transition to the manual-steering mode, then the computer 32 initiates the transition from the autonomous-steering mode to the manual-steering mode, described in the blocks 435 and 440.

If the computer 32 determines not to transition to the manual-steering mode, next, in a decision block 430, the computer 32 determines whether to switch to a mode other than the manual-steering mode. If the computer 32 has received an input from the occupant or from an autonomous-driving algorithm to transition to a different mode, then the computer 32 switches to that mode, and the process 400 ends. If the computer 32 has not received an input to transition to a different mode, then the process 400 returns to the block 410 and remains in the autonomous-steering mode.

If the computer 32 determines to transition to the manual-steering mode, after the decision block 425, in the block 435, the computer 32 illuminates one of the lights 42 that is at the steering-wheel angle θ corresponding to the steering angle φ of the vehicle 30, as shown in FIG. 3. For the purposes of this disclosure, "corresponding to" is defined as related by a steering ratio R. For the purposes of this disclosure, the steering ratio R is defined as the ratio of the steering-wheel angle θ of the steering wheel 58 to the steering angle φ of the road wheels 54 when the vehicle 30 is in the manual-steering mode. The steering ratio R may be a constant value or may vary depending on the steering angle φ or the steering-wheel angle θ, depending on a speed of the vehicle 30, etc. For example, the steering ratio R may linearly depend on the speed of the vehicle 30 and may be larger at higher speeds than at lower speeds. The illuminated light signals the steering angle φ of the vehicle 30 to the occupant. In the manual-steering mode, the location of the illuminated light is treated as a center position of the steering-wheel rim 60 for the purposes of receiving steering input from the occupant.

Next, in a block 440, the computer 32 enters the manual-steering mode. The computer 32 no longer holds the steering wheel 58 stationary, but allows the steering wheel 58 to be moved by a human driver.

Next, or after the decision block 405 if the steering mode is the manual-steering mode, in the block 445, the computer 32 receives steering input from the occupant. Specifically, the computer 32 receives the steering-wheel angle θ of the steering-wheel rim 60, which may be turned by the occupant, with the illuminated light taken as the center position of the steering-wheel rim 60. In other words, the steering-wheel angle θ of the steering wheel 58 is the angle between the location of the illuminated light and the reference angle. The computer 32 instructs the steering system 38 to turn the road wheels 54 to the steering angle φ, related by the steering ratio R to the steering-wheel angle θ of the steering-wheel rim 60.

Next, in a decision block 450, the computer 32 determines whether to transition to the autonomous-steering mode. The computer 32 transitions to the autonomous-steering mode if the computer 32 receives an input from the occupant or from an autonomous-driving algorithm to transition to the autonomous-steering mode. If the computer 32 determines to not transition to the autonomous-steering mode, the process 400 proceeds to a decision block 465.

If the computer 32 determines to transition to the autonomous-steering mode, next, in a block 455, the computer 32 enters the autonomous-steering mode.

Next, in a block 460, the computer 32 deactivates the lights 42 so that none of the lights 42 is illuminated. After the block 460, the process 400 returns to the block 410.

If the computer 32 determines to not transition to the autonomous-steering mode, after the decision block 450, in the decision block 465, the computer 32 determines whether to switch to a mode other than the autonomous-steering mode. If the computer 32 has received an input from the occupant or from an autonomous-driving algorithm to transition to a different mode, then the computer 32 switches to that mode, and the process 400 ends. If the computer 32 has not received an input to transition to a different mode, then the process 400 returns to the block 445 and remains in the manual-steering mode.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

"Substantially" as used herein means that a dimension, time duration, shape, or other adjective may vary slightly from what is described due to physical imperfections, power interruptions, variations in machining or other manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   upon determining that a vehicle entered an autonomous-steering mode, deactivate a plurality of lights on a steering-wheel rim;
   upon determining that the vehicle is in the autonomous-steering mode, instruct an actuator rotatably coupled to the steering-wheel rim to hold the steering-wheel rim stationary while turning road wheels of the vehicle to create a current steering angle of the road wheels; and
   upon initiating a transition of the vehicle from the autonomous-steering mode to a manual-steering mode, illuminate at least one of the lights, wherein a position of the illuminated lights indicates a steering-wheel angle, wherein the steering-wheel angle correspond s to the current steering angle of the road wheels of the vehicle by a steering ratio.

2. The computer of claim 1, wherein the instructions further include to, upon receiving data indicating that hands of an occupant of the vehicle are grasping the steering-wheel rim, initiate the transition from the autonomous-steering mode to the manual-steering mode.

3. The computer of claim 2, wherein the data indicating that the hands of the occupant are grasping the steering-wheel rim include data from a pressure sensor attached to the steering-wheel rim.

4. The computer of claim 2, wherein the data indicating that the hands of the occupant are grasping the steering-wheel rim include data from a capacitive sensor disposed on the steering-wheel rim.

5. The computer of claim 2, wherein the data indicating that the hands of the occupant are grasping the steering-wheel rim include data from a torque sensor coupled to the steering-wheel rim.

6. The computer of claim 2, wherein the data indicating that the hands of the occupant are grasping the steering-wheel rim include data from a camera having a field of view encompassing the steering-wheel rim.

7. The computer of claim 1, wherein the instructions further include to, upon receiving data indicating that a brake pedal is pressed, initiate the transition from the autonomous-steering mode to the manual-steering mode.

8. A method, comprising:
upon determining that a vehicle entered an autonomous-steering mode, deactivating, by a computer of the vehicle, a plurality of lights on a steering-wheel rim;
upon determining that the vehicle is in the autonomous-steering mode, instructing, by the computer, an actuator rotatably coupled to the steering-wheel rim to hold the steering-wheel rim stationary while turning road wheels of the vehicle to create a current steering angle of the road wheels; and
upon initiating a transition of the vehicle from the autonomous-steering mode to a manual-steering mode, illuminating at least one of the lights, wherein a position of the illuminated lights indicates a steering-wheel angle, wherein the steering-wheel angle corresponds to the current steering angle of the road wheels of the vehicle by a steering ratio.

9. The method of claim 8, further comprising, upon receiving data indicating that hands of an occupant of the vehicle are grasping the steering-wheel rim, initiating, by the computer, the transition from the autonomous-steering mode to the manual-steering mode.

10. The method of claim 9, wherein the data indicating that the hands of the occupant are grasping the steering-wheel rim include data from a pressure sensor attached to the steering-wheel rim.

11. The method of claim 9, wherein the data indicating that the hands of the occupant are grasping the steering-wheel rim include data from a capacitive sensor disposed on the steering-wheel rim.

12. The method of claim 9, wherein the data indicating that the hands of the occupant are grasping the steering-wheel rim include data from a torque sensor coupled to the steering-wheel rim.

13. The method of claim 9, wherein the data indicating that the hands of the occupant are grasping the steering-wheel rim include data from a camera having a field of view encompassing the steering-wheel rim.

14. The method of claim 8, further comprising, upon receiving data indicating that a brake pedal is pressed, initiating, by the computer, the transition from the autonomous-steering mode to the manual-steering mode.

15. A vehicle, comprising:
a steering-wheel rim;
a plurality of lights on the steering-wheel rim;
an actuator rotatably coupled to the steering-wheel rim; and
a computer in communication with the plurality of lights and the actuator, the computer programmed to,
upon determining that the vehicle entered an autonomous-steering mode, deactivate the plurality of lights;
upon determining that the vehicle is in the autonomous-steering mode, instruct the actuator to hold the steering-wheel rim stationary while turning road wheels of the vehicle to create a current steering angle of the road wheels; and
upon initiating a transition of the vehicle from the autonomous-steering mode to a manual-steering mode, illuminate at least one of the lights, wherein a position of the illuminated lights indicates a steering-wheel angle, wherein the steering-wheel angle corresponds to the current steering angle of the road wheels of the vehicle by a steering ratio.

16. The vehicle of claim 15, further comprising a sensor in communication with the computer, wherein the sensor is one of a pressure sensor attached to the steering-wheel rim, a capacitive sensor disposed on the steering-wheel rim, a torque sensor coupled to the steering-wheel rim, and a camera facing the steering-wheel rim.

17. The vehicle of claim 16, wherein the computer is further programmed to, upon receiving data from the sensor indicating that hands of an occupant of the vehicle are grasping the steering-wheel rim, initiate the transition from the autonomous-steering mode to the manual-steering mode.

\* \* \* \* \*

UNITED STATES PATENT AND TRADEMARK OFFICE
CERTIFICATE OF CORRECTION

PATENT NO. : 10,545,498 B2
APPLICATION NO. : 15/655947
DATED : January 28, 2020
INVENTOR(S) : Jens Christiansen et al.

Page 1 of 1

It is certified that error appears in the above-identified patent and that said Letters Patent is hereby corrected as shown below:

In the Claims

Column 10, Line 48, Claim 2: replace "correspond s" with --corresponds--.

Signed and Sealed this
Twenty-fourth Day of March, 2020

Andrei Iancu
*Director of the United States Patent and Trademark Office*